(12) United States Patent
Yadav et al.

(10) Patent No.: US 11,340,824 B1
(45) Date of Patent: May 24, 2022

(54) EFFICIENT OBJECT STORAGE MANAGEMENT WHEN PERFORMING BACKUPS TO A CLOUD-BASED OBJECT STORAGE

(71) Applicant: EMC IP Holding Company LLC, Hopkinton, MA (US)

(72) Inventors: Sunil Yadav, Bangalore (IN); Ravi Vijayakumar Chitloor, Bengaluru (IN); Shelesh Chopra, Bangalore (IN); Amarendra Behera, Bangalore (IN); Tushar Dethe, Bangalore (IN); Jigar Bhanushali, Valsad (IN); Deependra Singh, Kanpur (IN); Himanshu Arora, Bangalore (IN); Prabhat Kumar Dubey, Chikkanagamangala (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 17 days.

(21) Appl. No.: 17/141,475

(22) Filed: Jan. 5, 2021

(51) Int. Cl.
*G06F 3/06* (2006.01)
*H04L 67/1097* (2022.01)
*G06F 16/23* (2019.01)

(52) U.S. Cl.
CPC ............. *G06F 3/065* (2013.01); *G06F 3/067* (2013.01); *G06F 3/0619* (2013.01); *G06F 16/2379* (2019.01); *H04L 67/1097* (2013.01)

(58) Field of Classification Search
CPC .................................. G06F 3/065; G06F 3/067
USPC ........................................................... 711/162
See application file for complete search history.

(56) References Cited

U.S. PATENT DOCUMENTS

| | | | |
|---|---|---|---|
| 10,515,701 B1 * | 12/2019 | Aster ..................... | G06F 3/0607 |
| 11,093,387 B1 * | 8/2021 | Chinthekindi ........ | G06F 3/0646 |
| 2012/0265954 A1 * | 10/2012 | Haustein ................ | G06F 3/061 |
| | | | 711/E12.071 |
| 2021/0342067 A1 * | 11/2021 | Meister ................. | G06F 3/0688 |

* cited by examiner

*Primary Examiner* — Than Nguyen
(74) *Attorney, Agent, or Firm* — Dergosits & Noah LLP; Todd A. Noah (57) ABSTRACT

Described is a system (and method) for efficient object storage management when backing up data to a cloud-based object storage. The system may be implemented as part of a server (or gateway) that provides a backup service to a client device by acting as an intermediary when backing up data from the client device to a third-party cloud-based object storage. The system may implement various specialized procedures to efficiently store backup data as objects within the object storage. The procedures may include packing client data into objects of a consistent size to improve storage performance. The system may also improve storage performance and conserve storage by analyzing the data stored within an object and reallocating the data as necessary. More particularly, the system may efficiently reallocate data to new objects when the amount of live data within an object falls below a predetermined threshold.

20 Claims, 4 Drawing Sheets

EFFICIENT OBJECT STORAGE MANAGEMENT WHEN PERFORMING BACKUPS TO A CLOUD-BASED OBJECT STORAGE

TECHNICAL FIELD

This disclosure relates to cloud-based storage systems, and more particularly, managing backup data stored on a cloud-based object storage.

BACKGROUND

Cloud-based storage systems (or on-demand storage systems) may provide various tools that are crucial for enterprise level network clients. For example, clients may rely on such systems for data protection and recovery services that efficiently back up and recover data in the event of data loss to allow business applications to remain in service or quickly come back up to service. Clients may rely on a third-party cloud-based storages to leverage the benefits associated with such systems (or services) such as cost efficiency (e.g. pay-per-use model) and scalability. These cloud-based storages may implement an object-based storage architecture, and accordingly, client data such as backup data may be stored as objects (or data objects). To provide access to these object storages, the cloud-based providers often make available various storage APIs (Application Programming Interfaces). However, due to the universal nature of these APIs, directly relying on such APIs to perform backup operations often results in using large amounts of storage space to meet certain recovery needs. For example, clients may require backup data to adhere to certain retention requirements, which results in using tools that store the data as immutable objects. However, these tools may handle various types of client data in uniform manner, thus limiting the ability to implement efficient data-specific storage techniques. Accordingly, the native capabilities of cloud-based object storages may result in an inefficient allocation of storage resources for backup data which in turn increases potential storage costs. Thus, there is a continued need to efficiently manage storage space when relying on cloud-based object storages for data protection and backup.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure. Although these embodiments are described in sufficient detail to enable one skilled in the art to practice the disclosed embodiments, it is understood that these examples are not limiting, such that other embodiments may be used and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment can be included in at least one embodiment of the disclosure. The appearances of the phrase "embodiment" in various places in the specification do not necessarily all refer to the same embodiment.

Described is a system (and method) for efficient object storage management when backing up data to a cloud-based object storage. The system may be implemented as part of a server (or gateway) that provides a backup service to a client device. The server may also act as an intermediary between a client device and the third-party cloud-based object storage. The system may implement various specialized procedures to efficiently store and manage backup data within the object storage. These procedures may include packing client data into objects of a consistent size to improve data operation efficiency. The object size may also be customized based on the type of data being backed up. For example, when backing up client emails, the system may pack a certain amount of emails into objects sized specifically for email data. The system may also conserve storage space on the object storage by analyzing the data stored within an object and reallocating the data as necessary. For example, data may be stored in objects in an immutable manner, and thus, the system may efficiently reallocate data to new objects based on the amount of live data remaining within an object. For example, when the amount of live data within an object falls below a predetermined threshold, the live data may be reallocated to a new object. To provide such a capability, the system may leverage information stored by a specialized metadata database maintained by the system as part of the data management infrastructure.

In some embodiments, such a system may be provided within an operating environment. An example of such an operating environment is further described herein with reference to FIG. 1. However, in general, embodiments of the disclosure may include and/or be implemented in an operating environment including a cloud-based services environment that may be, or include, a data protection operating environment that includes data protection and backup services. For example, at least some functionality may be provided by, or implemented in connection with, various platforms such as the Data Domain™ data protection platform provided by Dell EMC Corporation (Dell EMC), and associated systems, methods, and components, although use of this particular platform is provided only by way of illustration and is not required.

In some embodiments, the operating environment may take the form of a cloud-based environment. However, embodiments of the disclosure may also be implemented for an on-premises environment, and hybrid environments that include public and private elements, as well as any other type of environment. In addition, any of these cloud environments, or other operating environments, may take the form of an operating environment that is partly, or completely, virtualized. The environment may include one or more host devices that each host one or more applications used by a client of the environment. As such, a particular client may employ, or otherwise be associated with, one or more instances of each of one or more applications. In general, the applications employed by the clients are not limited to any particular functionality or type of functionality.

Any of the devices, including the clients, servers, and hosts, in the operating environment can take the form of software, physical machines, or virtual machines (VM), or any combination thereof, though no particular device implementation or configuration is required for any embodiment. Similarly, storage components (or devices) such as databases, storage servers, storage volumes, storage disks, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term "data" is intended to be broad in scope. Accordingly, data may include data objects (or objects), data segments such as may be produced by data stream segmentation processes, data chunks, data blocks, atomic data, emails, files, contacts, directories, sub-directories, volumes, etc. In addition, the storage of data can employ any suitable storage technique, infrastructure, or hardware (e.g. Solid State Drive (SSD), Hard Disk Drive (HDD)), which may include storage systems provided by a cloud service provider.

Figure 1:
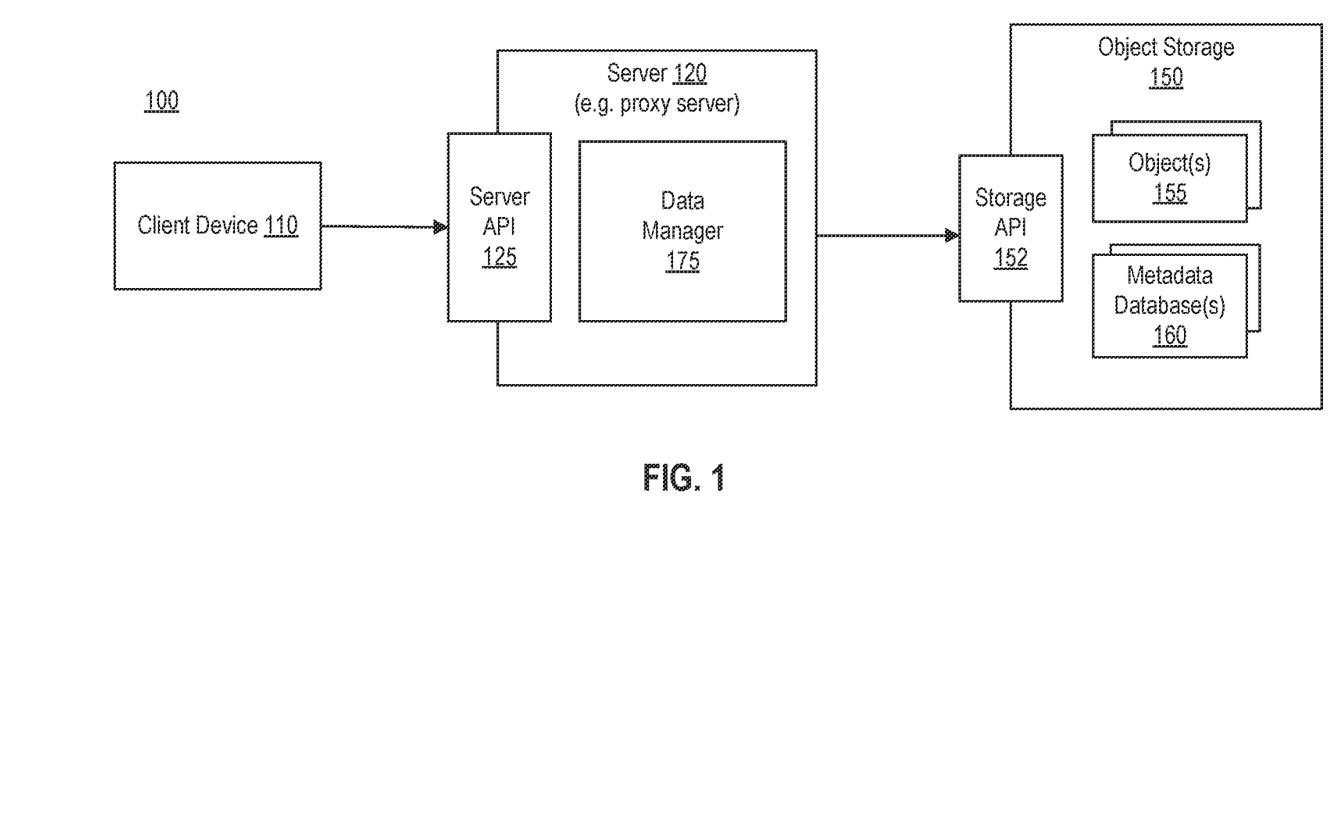
FIG. 1 is a block diagram illustrating an example of an operating environment that may be used in conjunction with one or more embodiments of the disclosure.

More specifically, and with reference to FIG. 1, shown is a block diagram illustrating an example of an operating environment 100 for managing backup data on an object storage according to one or more embodiments of the disclosure. It should be noted that the components of operating environment 100 may interact via a network, which may be any type of wired or wireless network including a local area network (LAN), a wide area network (WAN), or a direct communication link, or other suitable connection.

As shown, the environment 100 may include a client device 110, a server (e.g. a cloud-based component/gateway and/or a proxy server) 120, and a cloud-based (or on-demand) object storage 150. In general, the server 120 may act as an intermediary between the client device 110 and the object storage 150. In some embodiments, the client device 110 may be associated with a client that is a customer (or subscriber, client, tenant, user, account, etc.) of a backup service or platform (e.g. software/platform-as-a-service) provided by a first entity, as well as a customer of an object storage or service (e.g. software/platform-as-a-service) provided by a different (or second) entity. For example, the server 120 may be provided as part of the backup service provided by the first entity (e.g. Dell EMC), and the object storage 150 may be provided as part of a cloud-based object storage service provided by the different entity (e.g. Amazon S3, Microsoft Azure, IBM Cloud Object Storage, Google Cloud Storage, etc.). In some embodiments, the first entity providing the backup service may also provide (or host) the client device 110 (e.g. as part of a VM).

The client device (or client system) 110 may be associated with client data (or data) that is backed up to the object storage 150. The object storage (or object storage system) 150 may include a persistent object storage that implements a storage architecture that manages data as an object(s) 155. For example, each object 155 stored by the object storage 150 may include data, meta-data, and/or a globally unique identifier for the object. The client device 110 may use the server 120 as an intermediary for managing client backup data stored on the object storage 150. For example, the server 120 may provide enhanced security by being a single secure point of access to data stored externally on the object storage 150. For example, a client device 110 may implement a certain network configuration (e.g. firewall) that limits external access to the client environment. Such a network configuration may be customized to authorize external access to the client device 110 only by the server 120 and not the object storage 150 directly. In addition, the server 120 may also allow the client device 110 to offload resource intensive data management processing. For example, the server 120 may handle backup-related data processing before storing data into the object storage 150. Accordingly, the server 120 may provide advantages over traditional proxy servers that merely forward data to the object storage 150. In addition, the server 120 may be an application or hardware component remote from the client device 110 (e.g. as part of a cloud-based service). Accordingly, the server 120 may be scalable such that it may perform data operations in parallel for multiple client devices 110 and for multiple object storages 150.

As described, the server 120 may act as an intermediary for communications between the client device 110 and an object storage 150. For example, these communications may include requests by the client device 110 to perform data operations on the object storage 150, which are routed through the server 120. For example, the client device 110 may provide (or send, transmit, etc.) client data (or data) to the server 120 using a server API 125. The server 120 may then initiate (or perform, execute, etc.) a corresponding storage operation directly on the object storage using the storage API 152. In some embodiments, the server API 125 may be a REST API that includes a common set of operations that correspond to various data-related operations on the object storage 150. For example, the server API 125 may include operations allowing a client device 110 to store and recover client data backed up to the object storage 150. For example, the server API 125 may allow the client device 110 to read data from an object storage 150, write data to an object storage 150, copy data within the object storage 150, and various other operations for managing data. The same set of operations provided by the server API 125 may be used by the client device 110 irrespective of the type of object storage 150. To provide such object-storage-agnostic functionality, the server 120 may include a function library that includes object-storage-specific functions. Accordingly, the server 120 may use such object-storage-specific functions to interact directly with the object storage 150. For example, the server 120 may initiate data operations directly on the object storage 150 by calling various methods (functions, operations, etc.) of the storage API 152. In some embodiments, the storage API 152 may include only a standard set of storage operations. Accordingly, the server 120 may implement efficient storage and recovery procedures as further described herein.

As described, the server 120 may manage backed up client data stored on the object storage 150. Accordingly, the server 120 may include a data manager 175. The data manager (or manager) 175 may coordinate (or manage, orchestrate, execute, automate, etc.) the initiation (or execution) of storage and recovery operations on the object storage 150. In some embodiments, the data manager 175 may provide a user interface that allows a user to perform and configure various settings associated with managing backup data. For example, the user interface may allow a user to configure (e.g. input) various settings such as the predetermined threshold for reallocating (or moving) live data to a new object as further described herein. In addition, the data manager 175 may direct (or control, initiate, etc.) other components of the operating environment 100 to perform various processes as further described herein.

To further improve potential storage and recovery efficiency, the server 120 may leverage a specialized metadata database 160. The metadata database 160 may be maintained by the server 120. The metadata database 160 may include an embedded database. For example, the metadata database 160 may be created by the server 120 using a particular software library (e.g. SQLite library). The metadata database 160 may reside on the object storage 150, the server 120, and/or another component (e.g. cloud-based component) such that is accessible by the server 120. For example, when the metadata database 160 resides on the object storage 150, the server 120 may access (e.g. update) the metadata database 160 by accessing the storage API 152.

The metadata database 160 may store metadata associated with client data stored on the client device 110 and/or backed up to the object storage 150. The metadata may include information that is stored as part of the client data. For example, the client data may include data files (or files) that store metadata as part of the file. Accordingly, a copy of such metadata may also be stored as part of the metadata database 160. In addition, the metadata database 160 may store information associated with whether data stored within the object storage is live or dead. As referred to herein, live data may include data stored on the object storage that is still required for recovery purposes. For instance, live data may include backup data that does not correspond to client data that has been deleted. As referred to herein, dead data may include data (or an instance thereof) that is no longer required for recovery purposes. For example, dead data may include data stored on the object storage that corresponds to data that has been deleted from the client device. Accordingly, the server 120 may not need to retain such data on the object storage. As another example, dead data may include data on the object storage 150 that may be redundant or expired.

The metadata database 160 may also store various types of backup information associated with the backed up client data. For example, the backup information may include data identifying information (e.g. data ID), a point-in-time the client data was backed up, a storage location of the backed-up client data, an object ID to which the backed up client data is stored, data size information, and various other types of information. Accordingly, the metadata database 160, and more particularly, the metadata stored therein, may be leveraged by the server 120 when storing data in an efficient manner as further described herein.

Figure 2:
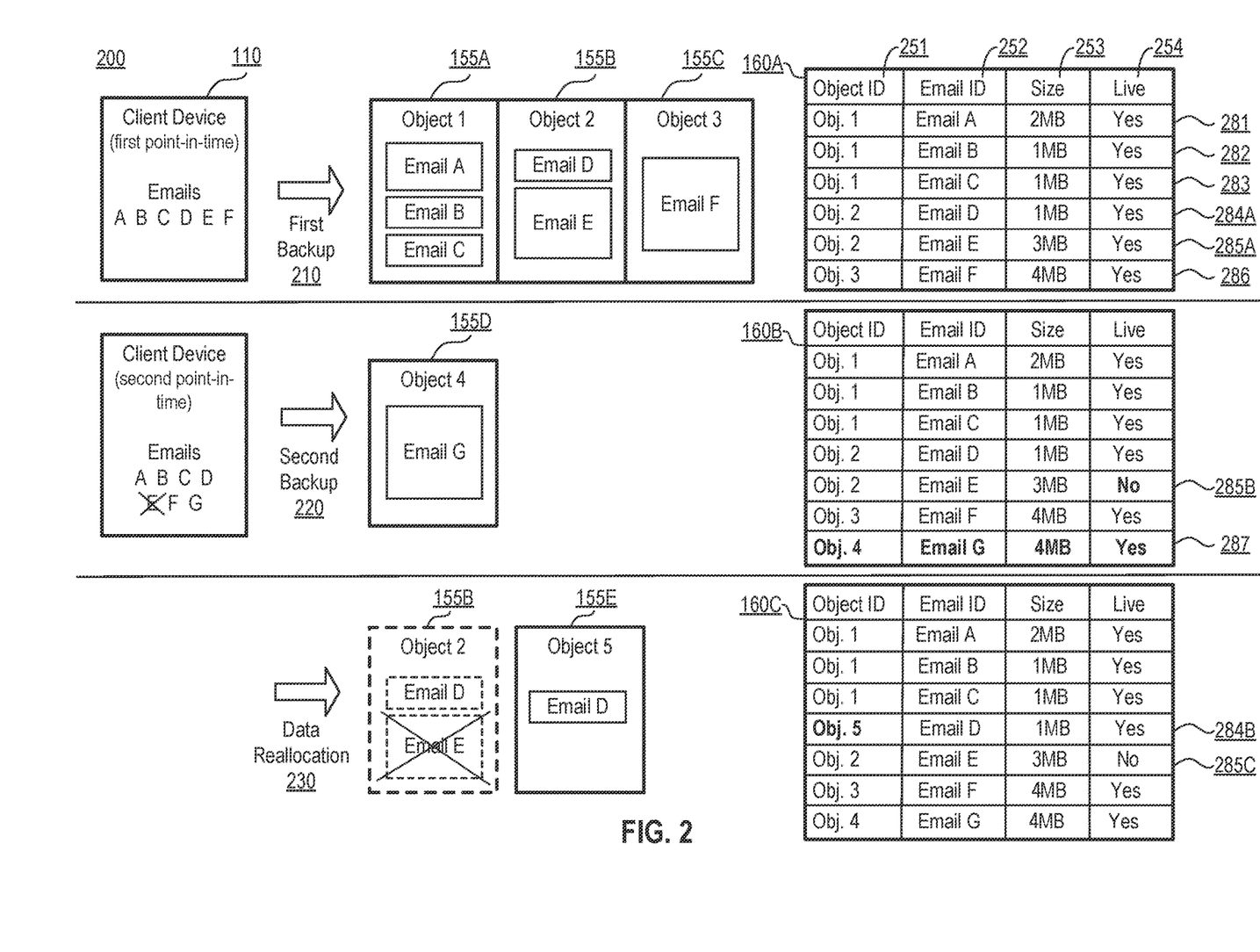
FIG. 2 is a diagram illustrating an example of managing backup data within one or more objects and in association with a metadata database according to one or more embodiments of the disclosure.

FIG. 2 is a diagram illustrating an example of managing backup data within one or more objects and in association with a metadata database according to one or more embodiments of the disclosure.

In this example, the client data includes emails although any type of data is contemplated. As shown, the client device (e.g. client device 110) at a first point-in-time stores emails A, B, C, D, E, and F. Accordingly, as part of performing a first (or initial) backup 210 (e.g. at the first point-in-time), the server (e.g. server 120) may store the emails within newly created objects 1 155A, 2 155B, and 3 155C of the object storage (e.g. object storage 150). In other words, objects 1 155A, 2 155B, and 3 155C may be associated with the first backup 210 and/or the first point-in-time. In some embodiments, objects 155 may be configured to store a certain amount of data that is specialized for the type of data to be backed up. For example, each of the objects 155 may be configured to store an amount of data that is specialized for client emails (e.g. approximately 4 MB). Accordingly, to efficiently utilize storage space on the object storage, the server may perform a packing (or grouping, combining, etc.) of data based on the amount of data an object 155 is configured to store. Thus, in this example, the server may attempt to pack emails into each of the objects 155 such that each object stores approximately 4 MB of data. For example, the server may store (e.g. pack) emails A, B, and C, which are approximately 2 MB, 1 MB, and 1 MB in size respectively, within object 1 155A; emails D, and E, which are approximately 1 MB and 3 MB in size respectively, within object 2 155B; and email F, which is approximately 4 MB in size, within object 3 155C.

Additionally, the server may store metadata associated with the backed up client data within the metadata database 160 (or instances or versions thereof). In this example, the metadata database 160 is in the form of a table although any data structure may be used. As shown, the metadata database 160 may store various types of information such as an object ID 251 that indicates the object in which the data (e.g. email) is stored, an ID 252 that uniquely identifies the data item (e.g. email), a size 253 that indicates the approximate size of the data time (e.g. email), and a live indicator 254 that indicates whether the particular data item is live or dead. Metadata database 160A represents the state of the metadata database based on the first backup 210. For example, in response to the first backup 210, the server may store entries 281, 282, 283, 284A, 285A, and 286 that correspond to emails A, B, C, D, E, and F respectively. By way of example, entry 281 indicates that email A is stored in object 1, has an approximate size of 2 MB, and is a live data item.

Continuing with this example, after performing the first backup 210, the client data stored on the client device may subsequently change. As shown, the client device 110, at the second point-in-time, may now store new email G, and email E has been deleted. Accordingly, as part of performing a second (or subsequent) backup 220 (e.g. at the second point-in-time), the server may store (e.g. pack) email G, which is approximately 4 MB in size, within newly created object 4 155D. Accordingly, object 4 155D may be associated with the second backup 220 and/or the second point-in-time. Metadata database 160B represents the state of the metadata database based on the second backup 210. For example, in response to the second backup 220, the server may store new entry 287 that corresponds to new email G. As shown, entry 287 indicates that email G is stored in object 4 155D, has an approximate size of 4 MB, and is a live data item. In addition, in response to the deletion of email E on the client device 110, the server may indicate that email E is no longer live (e.g. no longer required). In particular, as shown in metadata database 160B, the server may update the corresponding entry (previous entry 285A), now shown as entry 285B, to indicate that email E is no longer live.

In some embodiments, the second backup 220, may be an incremental backup (e.g. at a second point-in-time). To perform the incremental backup (also referred to as a differential incremental backup), the server may determine the changes (or delta) of client data between the point-in-time of the previous backup (e.g. first point-in-time) and the point-in-time of the current backup (e.g. second point-in-time). In addition, as part of performing the second backup 220 (e.g. an incremental backup), the server may only store the new data (e.g. email G), and the previously backed up emails (e.g. emails A-F) are retained in objects 1-3 155A-C. In other words, the data of objects 1-3 155A-C are not copied to additional objects as part of the second backup 220. Instead, when a recovery is required, the server may combine the required data from objects 1-5 155A-E (minus any deleted objects) to create a complete dataset. In other words, the server may combine the data at the time of recovery to conserve storage space on the object storage.

To efficiently managing storage space within the object storage, the server may periodically perform a data reallocation 230. The server may perform such a reallocation by determining whether any of the objects 155 currently storing data have an amount of live data that falls below a predetermined threshold. In this example, if the predetermined threshold is less than or equal to 50% of the data stored by the object being live, then the deletion of email E results in object 2 155B storing only 25% live data (e.g. 1 MB out of 4 MB). Thus, the server may determine the deletion of email E satisfies the predetermined threshold for reallocating (or moving) data. In particular, as shown, the remaining live data (e.g. email D) may be stored in newly created object 5 155E. The server may also update the corresponding entry (previous entry 284A), now shown as 284B in metadata database 160C, to indicate that email D is now stored in object 5.

In some embodiments, the server may delete object 2 155B in response to reallocating the remaining live data (e.g. email D) to object 5 155E. Accordingly, the server may update the corresponding entry for email E, shown as entry 285C in metadata database 160C. Although not shown, this update may include deleting entry 285C, or updating entry 285C to indicate that object 2 has been deleted. In some embodiments, instead of deleting email E completely from the object storage, the server may move email E to another (e.g. lower) storage tier. In such a scenario, entry 285C may be updated to indicate the new storage location.

It should be noted that the metadata database 160 may also include additional types of metadata (not shown). For example, the metadata database 160 may include metadata associated with a particular backup such as point-in-time information indicating when the backup was performed. This information may be stored as part of the metadata database 160, or may be stored in a separate database by the server. Accordingly, the server may determine which objects 155 or data (e.g. emails) are associated with a particular backup and/or a point-in-time, for example, when performing client data recovery.

In some embodiments, as part of storing (or packing) data into objects 155 of the object storage, the server may perform additional operations to efficiently manage data (e.g. backup data). In some embodiments, storing data within the objects 155 may include performing compression and/or encryption of the data. For example, emails A-C stored within object 1 155A may be compressed and/or encrypted by the server. In addition, the server may perform a deduplication when storing data within the objects 155. For example, if email G is a copy of email F, as part of the second backup 220, the server may not store a deduplicate copy of email G on object 4 155D, and instead, only update metadata database 160B to indicate that email G is already stored by object 3 155C as email F.

Figure 3:
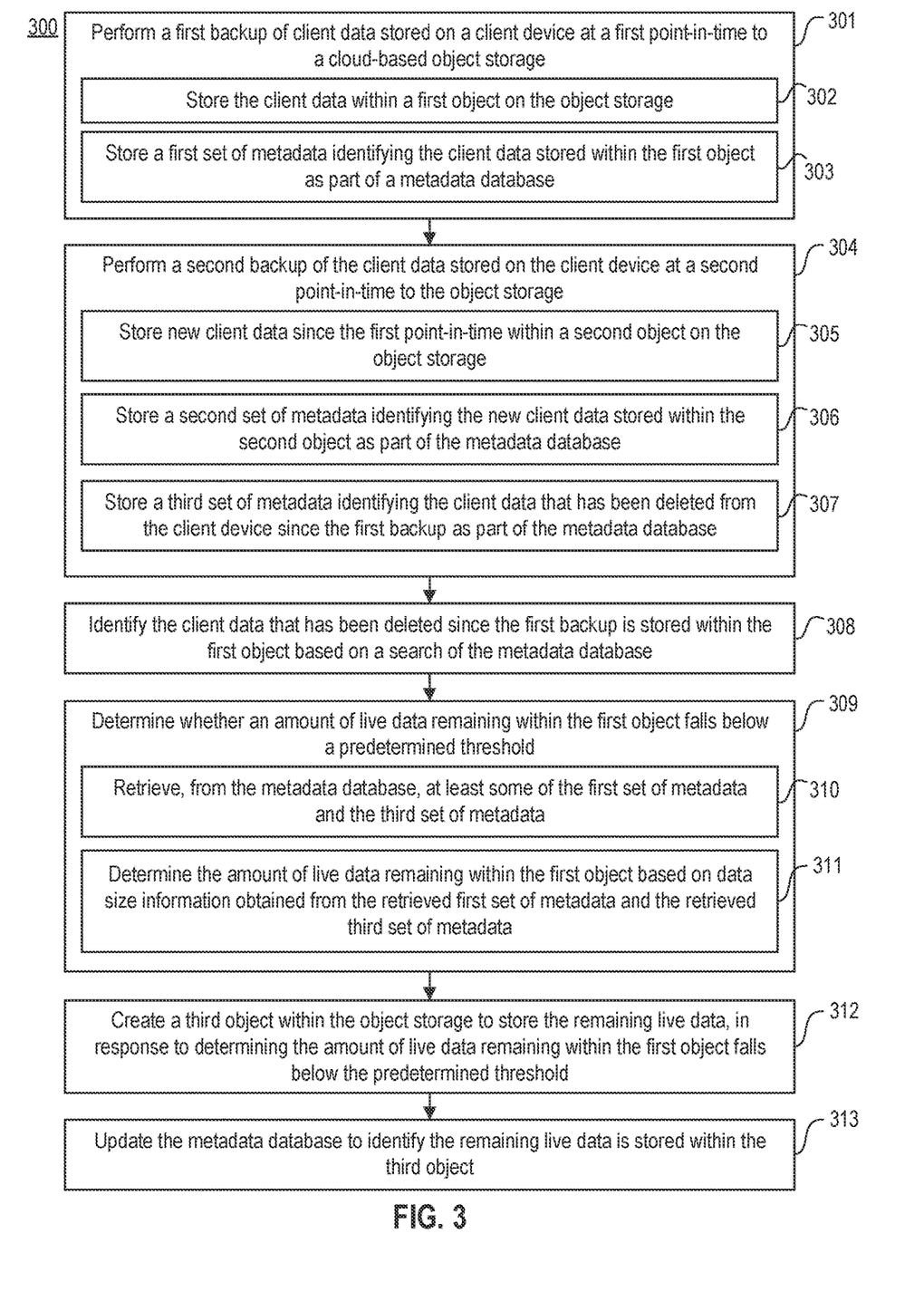
FIG. 3 is a flow diagram illustrating an example method of managing data stored on an object storage according to one or more embodiments of the disclosure.

FIG. 3 is a flow diagram illustrating an example method of managing data including reallocating data stored on an object storage according to one or more embodiments of the disclosure. Process 300 may use processing logic, which may include software, hardware, or a combination thereof. For example, process 300 may be performed by a system including one or more components described in operating environment 100 (e.g. server 120).

In 301, the system (e.g. server 120) may perform a first backup of client data stored on a client device (e.g. client device 110) to a cloud-based object storage (e.g. object storage 150). In some embodiments, the first backup (e.g. first backup 210) may be performed at a first point-in-time. In other words, the first backup of client data may be associated with a first point-in-time.

In 302, the first backup may include storing the client data within a first object on the object storage. For example, with reference to diagram 200, the system may perform a first backup 210 including storing emails D and E of the client device 110 to object 2 155B (e.g. a first object).

In 303, the first backup may also include storing a first set of metadata identifying the client data stored within the first object as part of a metadata database (e.g. metadata database 160). For example, with reference to diagram 200, the system may store entries 284A, and 285A (e.g. a first set of metadata) identifying emails D and E are stored within object 2 155B.

In 304, the system may perform a second backup of the client data stored on the client device to the object storage. In some embodiments, the second backup (e.g. second backup 220) may be performed at a second point-in-time. The second backup of client data may be associated with a second point-in-time.

In 305, the second backup may include storing new client data since the first point-in-time within a second object on the object storage. For example, with reference to diagram 200, the system may perform a second backup 220 including storing new email G (e.g. new client data since the first point-in-time) within object 4 155D (e.g. second object).

In 306, the second backup may also include storing a second set of metadata identifying the new client data stored within the second object as part of the metadata database. For example, with reference to diagram 200, the system may store entry 287 (e.g. a second set of metadata) identifying new email G is stored within object 4 155D.

In 307, the second backup may also include storing a third set of metadata identifying the client data that has been deleted from the client device since the first backup as part of the metadata database. For example, with reference to diagram 200, the system may store entry 285B (e.g. a third set of metadata) identifying email E has been deleted from the client device since the first backup. In some embodiments, storing the third set of metadata may include overwriting some of the first set of metadata. For example, with reference to diagram 200, entry 285B may overwrite entry 285A.

In 308, the system may identify the client data that has been deleted since the first backup is stored within the first object based on a search of the metadata database. Accordingly, the system may specifically analyze the first object to determine whether a reallocation of data within the first object may be required. For example, with reference to diagram 200, the system search (or query) the metadata database (e.g. based on email ID 252) to identify email E being stored within object 2 155B based on obtaining the object identifier (e.g. object ID 251) associated with email E from the metadata database.

In 309, the system may determine whether an amount of live data remaining within the first object falls below a predetermined threshold. In other words, the system may determine whether the amount of live data remaining within the first object satisfies threshold (or condition). For example, with reference to diagram 200, the system may determine whether the 1 MB of email D (e.g. the amount of live data remaining) within object 2 155B fails below the predetermined threshold.

The threshold may be based on a relative value such as the amount of live data vs. the total size of the object, the amount of live data vs. the amount of dead data stored by the object, or the amount of dead data vs. the size of the object. For example, the system may determine whether the amount of live data falls below 50% of the total amount of data within an object. The threshold may also be based on an absolute value such as the amount of remaining live data or the amount of dead data within an object. For example, the server may determine whether the amount of live data is less than (or falls below) an absolute value (e.g. 2 MB).

In some embodiments, the system may determine whether the amount of live data remaining within the first object falls below a predetermined threshold in response to recognizing that client data has been deleted from the client device since the first backup. For example, recognizing (or detecting, determining, etc.) may trigger the system to analyze objects storing deleted data to determine whether the live data remaining in such objects should be reallocated.

In addition, as described in operation 308, in some embodiments, the system may identify the client data that has been deleted since the first backup is stored within the first object. Accordingly, in such embodiments, the system may determine whether the amount of live data remaining within the first object falls below the predetermined threshold in response to identifying the client data that has been deleted since the first backup is stored within the first object. In other words, the system may specifically calculate the amount of live data remaining within the first object in response to identifying the deleted client data as being stored within the first object. For example, with reference to diagram 200, the system may determine whether the amount of live data remaining within object 2 155B fails below the predetermined threshold based on the determination that the deleted email E was stored in object 2 155B.

In 310, determining whether the amount of live data remaining within the first object falls below the predetermined threshold may include retrieving, from the metadata database, at least some of the first set of metadata identifying the client data stored within the first object, and the third set of metadata identifying the client data that has been deleted since the first backup.

Accordingly, in 311, the system may determine the amount of live data remaining within the first object based on data size information obtained from the retrieved first set of metadata and the retrieved third set of metadata. For example, with reference to diagram 200, the system may retrieve entry 284A (e.g. the first set of metadata), and entry 285B (e.g. the third set of metadata), and determine the amount of live data remaining within the first object based on the email size information (e.g. size 253) obtained from the entries 284A, and 285B. For example, the system may determine email D is 1 MB from entry 284A, and email E, which has been deleted, is 3 MB from entry 285B; thus, the amount of live data remaining with object 2 155B is 1 MB (e.g. only email D is live).

In addition, in some embodiments, the system may determine whether the amount of live data remaining within the first object falls below the predetermined threshold based on a comparison between the amount of live data remaining within the first object and an amount of the client data stored within the first object that has been deleted since the first backup.

Accordingly, in some embodiments, the predetermined threshold may be based on the amount of live data remaining within the first object compared to an amount of the client data stored within the first object that has been deleted since the first backup. For example, with reference to diagram 200, the system may compare 1 MB of email D (e.g. the amount of live data remaining) and the 3 MB of deleted email E (the amount of data deleted) to calculate a live data vs. dead ratio used as the predetermined threshold. For instance, the predetermined threshold may be satisfied when the ratio of live data to dead data drops below 50%. Accordingly, the 1 MB to 3 MB ratio (or 33%) of the above example would satisfy such a threshold. As another example, the predetermined threshold may be satisfied when the amount of live data drops below 30% of the total amount of data stored within the first object. Accordingly, the 1 MB of live data from a total of 4 MB of data (e.g. 25%) of live data remaining in the above example would satisfy such a threshold.

In some embodiments, the system may also determine whether the client data stored in the first object expires before the client data stored in the second object. The system may consider the expirations of the first and second objects to ensure that data that may be required for recovery is not prematurely deleted. For example, with reference to diagram 200, data stored as part of the first backup 210 that expires after data stored as part of the second backup 220 may be required to perform a recovery to the point-in-time associated with the second backup. Accordingly, the system may be required preserve data in the first object even if the corresponding data is deleted from the client device.

In 312, the system may create a third object within the object storage to store the remaining live data. The system may create the third object in response to determining the amount of live data remaining within the first object falls below the predetermined threshold. For example, with reference to diagram 200, the system may determine the deletion of email E satisfies the predetermined threshold for reallocating data, and accordingly, email D (e.g. the live data remaining within object 2 155B) may be stored in newly created object 5 155E (e.g. third object).

As described, the system may determine whether the client data stored in the first object expires before the client data stored in the second object. In such embodiments, the third object may be created in further response to determining the client data stored in the first object expires before the client data stored in the second object. In other words, in some embodiments, the system may create the third object when it is determined that both the amount of live data remaining within the first object falls below the predetermined threshold and the client data stored in the first object expires before the client data stored in the second object.

In some embodiments, the system may also delete the first object in response to creating the third object to store the remaining live data. In some embodiments, deleting the first object may include deleting the first object from a first storage tier, and storing the data of the first object in a second storage tier of the object storage. For example, the second storage tier may be a long term (or retention) storage tier (e.g. a storage tier associated with a lower storage cost than the first storage tier).

In 313, the system may update the metadata database to identify the remaining live data is stored within the third object. For example, in reference to diagram 200, the system may update the previous entry 284A to entry 284B as shown in metadata database 160C, to indicate that email D is now stored in object 5.

Accordingly, in some embodiments, the system may efficiently manage and reallocate data within an object storage.

Figure 4:
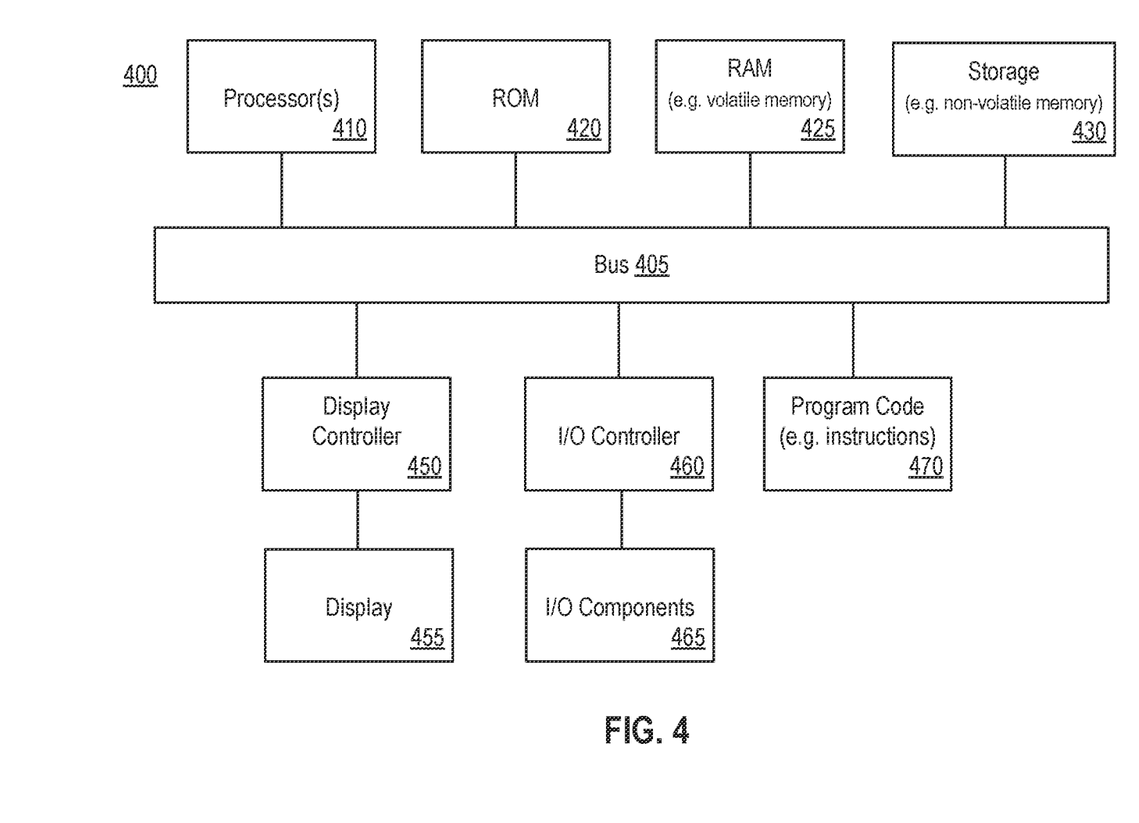
FIG. 4 is a block diagram illustrating an example of a computing system that may be used in conjunction with one or more embodiments of the disclosure.

FIG. 4 shows a block diagram of an example of a computing system that may be used in conjunction with one or more embodiments of the disclosure. For example, computing system 400 (or system, or server, or computing device, or device) may represent any of the devices or systems (e.g. server 120, data manager 175, client device 110, object storage 150, etc.) described herein that perform any of the processes, operations, or methods of the disclosure. Note that while the computing system 400 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 400 may include a bus 405 which may be coupled to a processor 410, ROM (Read Only Memory) 420, RAM (or volatile memory) 425, and storage (or non-volatile memory) 430. The processor(s) 410 may retrieve stored instructions from one or more of the memories 420, 425, and 430 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 410 may perform operations in an on-demand or "cloud computing" environment or as a service (e.g. within a "software as a service" (SaaS) implementation). Accordingly, the performance of operations may be distributed among the one or more processors 410, whether residing only within a single machine or deployed across a number of machines. For example, the one or more processors 410 may be located in a single geographic location (e.g. within a home environment, an office environment, or a server farm), or may be distributed across a number of geographic locations. The RAM 425 may be implemented as, for example, dynamic RAM (DRAM), or other types of memory that require power continually in order to refresh or maintain the data in the memory. Storage 430 may include, for example, magnetic, semiconductor, tape, optical, removable, non-removable, and other types of storage that maintain data even after power is removed from the system. It should be appreciated that storage 430 may be remote from the system (e.g. accessible via a network).

A display controller 450 may be coupled to the bus 405 in order to receive display data to be displayed on a display device 455, which can display any one of the user interface features or embodiments described herein and may be a local or a remote display device. The computing system 400 may also include one or more input/output (I/O) components 465 including mice, keyboards, touch screen, network interfaces, printers, speakers, and other devices. Typically, the input/output components 465 are coupled to the system through an input/output controller 460.

Program code 470 may represent any of the instructions, applications, software, libraries, toolkits, modules, components, engines, units, functions, logic, etc. as described herein (e.g. server 120, data manager 175, etc.). Program code 470 may reside, completely or at least partially, within the memories described herein (e.g. non-transitory computer-readable media), or within a processor during execution thereof by the computing system. Program code 470 may include both machine code, such as produced by a compiler, and files containing higher-level or intermediate code that may be executed by a computing system or other data processing apparatus (or machine) using an interpreter. In addition, program code 470 can be implemented as software, firmware, or functional circuitry within the computing system, or as combinations thereof. Program code 470 may also be downloaded, in whole or in part, through the use of a software development kit or toolkit that enables the creation and implementation of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that references to ordinal numbers such as "first," "second," "third," etc., may indicate an adjective for an element (e.g. any noun in the application). The use of ordinal numbers does not necessarily imply or create any particular ordering of the elements nor limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements. In addition, the use of the term "or" indicates an inclusive or (e.g. and/or) unless otherwise specified. For example, the phrase "at least one of x, y, or z" means any one of x, y, and z, as well as any combination thereof. In addition, the term "based on" is used to describe one or more factors that affect a determination. These terms do not foreclose additional factors that may affect a determination. For example, the phrase "determining A based on B" includes B being a factor that affects the determination of A, and does not foreclose the determination of A from also being based on C. However, in other instances, A may be determined based solely on B, such as by the use of the terms "only," "solely," and other such terminology. In addition, the term "approximately" or "substantially" may be used herein and may be interpreted as "as nearly as practicable," "within technical limitations," and the like.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A system comprising:
   one or more processors; and
   a non-transitory computer-readable medium storing a plurality of instructions, which when executed, cause the one or more processors to:
   perform a first backup of client data stored on a client device at a first point-in-time to a cloud-based object storage, the first backup including
       storing the client data within a first object on the object storage, and
       storing a first set of metadata identifying the client data stored within the first object as part of a metadata database;
   perform a second backup of the client data stored on the client device at a second point-in-time to the object storage, the second backup including
       storing new client data since the first point-in-time within a second object on the object storage,
       storing a second set of metadata identifying the new client data stored within the second object as part of the metadata database, and
       storing a third set of metadata identifying the client data that has been deleted from the client device since the first backup as part of the metadata database;
   determine whether an amount of live data remaining within the first object falls below a predetermined threshold;
   create a third object within the object storage to store the remaining live data, in response to determining the amount of live data remaining within the first object falls below the predetermined threshold; and
   update the metadata database to identify the remaining live data is stored within the third object.

2. The system of claim 1, wherein the plurality of instructions, when executed, further cause the one or more processors to:
   determine whether the client data stored in the first object expires before the client data stored in the second object, and
   wherein the third object is created in further response to determining the client data stored in the first object expires before the client data stored in the second object.

3. The system of claim 1, wherein the plurality of instructions, when executed, further cause the one or more processors to:
   delete the first object in response to creating the third object to store the remaining live data.

4. The system of claim 1, wherein the plurality of instructions, when executed, further cause the one or more processors to:
   identify the client data that has been deleted since the first backup is stored within the first object based on a search of the metadata database.

5. The system of claim 1, wherein the determining whether the amount of live data remaining within the first object falls below the predetermined threshold is in response to recognizing that client data has been deleted from the client device since the first backup.

6. The system of claim 1, wherein the determining whether the amount of live data remaining within the first object falls below the predetermined threshold includes:
   retrieving, from the metadata database, at least some of the first set of metadata identifying the client data stored within the first object and the third set of metadata identifying the client data that has been deleted since the first backup; and
   determining the amount of live data remaining within the first object based on data size information obtained from the retrieved first set of metadata and the retrieved third set of metadata.

7. The system of claim 6, wherein the predetermined threshold is based on the amount of live data remaining within the first object compared to an amount of the client data stored within the first object that has been deleted since the first backup.

8. A method comprising:
   performing a first backup of client data stored on a client device at a first point-in-time to a cloud-based object storage, the first backup including
       storing the client data within a first object on the object storage, and
       storing a first set of metadata identifying the client data stored within the first object as part of a metadata database;
   performing a second backup of the client data stored on the client device at a second point-in-time to the object storage, the second backup including
       storing new client data since the first point-in-time within a second object on the object storage,
       storing a second set of metadata identifying the new client data stored within the second object as part of the metadata database, and
       storing a third set of metadata identifying the client data that has been deleted from the client device since the first backup as part of the metadata database;
   determining whether an amount of live data remaining within the first object falls below a predetermined threshold;
   creating a third object within the object storage to store the remaining live data, in response to determining the amount of live data remaining within the first object falls below the predetermined threshold; and
   updating the metadata database to identify the remaining live data is stored within the third object.

9. The method of claim 8, further comprising:
   determining whether the client data stored in the first object expires before the client data stored in the second object, and
   wherein the third object is created in further response to determining the client data stored in the first object expires before the client data stored in the second object.

10. The method of claim 8, further comprising:
    deleting the first object in response to creating the third object to store the remaining live data.

11. The method of claim 8, further comprising:
    identifying the client data that has been deleted since the first backup is stored within the first object based on a search of the metadata database.

12. The method of claim 8, wherein the determining whether the amount of live data remaining within the first object falls below the predetermined threshold is in response to recognizing that client data has been deleted from the client device since the first backup.

13. The method of claim 8, wherein the determining whether the amount of live data remaining within the first object falls below the predetermined threshold includes:
- retrieving, from the metadata database, at least some of the first set of metadata identifying the client data stored within the first object and the third set of metadata identifying the client data that has been deleted since the first backup; and
- determining the amount of live data remaining within the first object based on data size information obtained from the retrieved first set of metadata and the retrieved third set of metadata.

14. The method of claim 13, wherein the predetermined threshold is based on the amount of live data remaining within the first object compared to an amount of the client data stored within the first object that has been deleted since the first backup.

15. A computer program product comprising a non-transitory computer-readable medium having a computer-readable program code embodied therein to be executed by one or more processors, the program code including instructions to:
- perform a first backup of client data stored on a client device at a first point-in-time to a cloud-based object storage, the first backup including
  - storing the client data within a first object on the object storage, and
  - storing a first set of metadata identifying the client data stored within the first object as part of a metadata database;
- perform a second backup of the client data stored on the client device at a second point-in-time to the object storage, the second backup including
  - storing new client data since the first point-in-time within a second object on the object storage,
  - storing a second set of metadata identifying the new client data stored within the second object as part of the metadata database, and
  - storing a third set of metadata identifying the client data that has been deleted from the client device since the first backup as part of the metadata database;
- determine whether an amount of live data remaining within the first object falls below a predetermined threshold;
- create a third object within the object storage to store the remaining live data, in response to determining the amount of live data remaining within the first object falls below the predetermined threshold; and
- update the metadata database to identify the remaining live data is stored within the third object.

16. The computer program product of claim 15, wherein the program code includes further instructions to:
- determine whether the client data stored in the first object expires before the client data stored in the second object, and
- wherein the third object is created in further response to determining the client data stored in the first object expires before the client data stored in the second object.

17. The computer program product of claim 15, wherein the program code includes further instructions to:
- delete the first object in response to creating the third object to store the remaining live data.

18. The computer program product of claim 15, wherein the program code includes further instructions to:
- identify the client data that has been deleted since the first backup is stored within the first object based on a search of the metadata database.

19. The computer program product of claim 15, wherein the determining whether the amount of live data remaining within the first object falls below the predetermined threshold is in response to recognizing that client data has been deleted from the client device since the first backup.

20. The computer program product of claim 15, wherein the determining whether the amount of live data remaining within the first object falls below the predetermined threshold includes:
- retrieving, from the metadata database, at least some of the first set of metadata identifying the client data stored within the first object and the third set of metadata identifying the client data that has been deleted since the first backup; and
- determining the amount of live data remaining within the first object based on data size information obtained from the retrieved first set of metadata and the retrieved third set of metadata, and
- wherein the predetermined threshold is based on the amount of live data remaining within the first object compared to an amount of the client data stored within the first object that has been deleted since the first backup.

* * * * *